(No Model.) 3 Sheets—Sheet 2.

D. M. PFAUTZ.
SPRING PROPELLED VEHICLE.

No. 490,983. Patented Jan. 31, 1893.

Witnesses
Fred D. Goodwin
Alex. Barkoff

Inventor
Daniel M. Pfautz
by his Attorneys
Howson & Howson

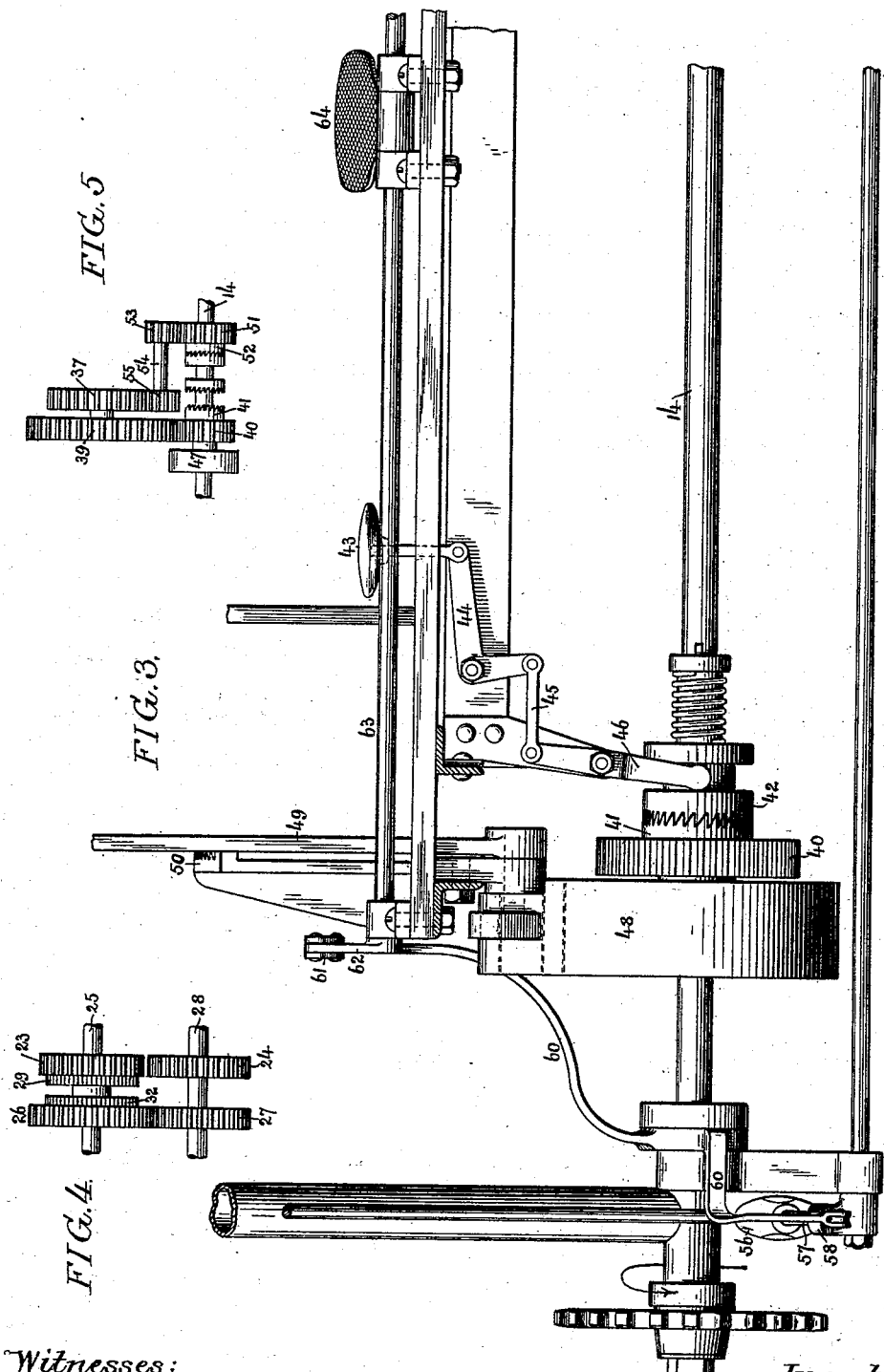

UNITED STATES PATENT OFFICE.

DANIEL M. PFAUTZ, OF PHILADELPHIA, PENNSYLVANIA, ASSIGNOR TO THE COMPOUND SPRING POWER COMPANY, OF CAMDEN, NEW JERSEY.

SPRING-PROPELLED VEHICLE.

SPECIFICATION forming part of Letters Patent No. 490,983, dated January 31, 1893.

Application filed February 29, 1892. Serial No. 423,290. (No model.)

*To all whom it may concern:*

Be it known that I, DANIEL M. PFAUTZ, a citizen of the United States, and a resident of Philadelphia, Pennsylvania, have invented certain Improvements in Spring-Propelled Vehicles, of which the following is a specification.

My invention comprises certain improvements in the winding, power transmitting, braking, and steering gears of the vehicle, the special features forming the subject of my invention being fully set forth and specifically claimed hereinafter.

Figure 1:
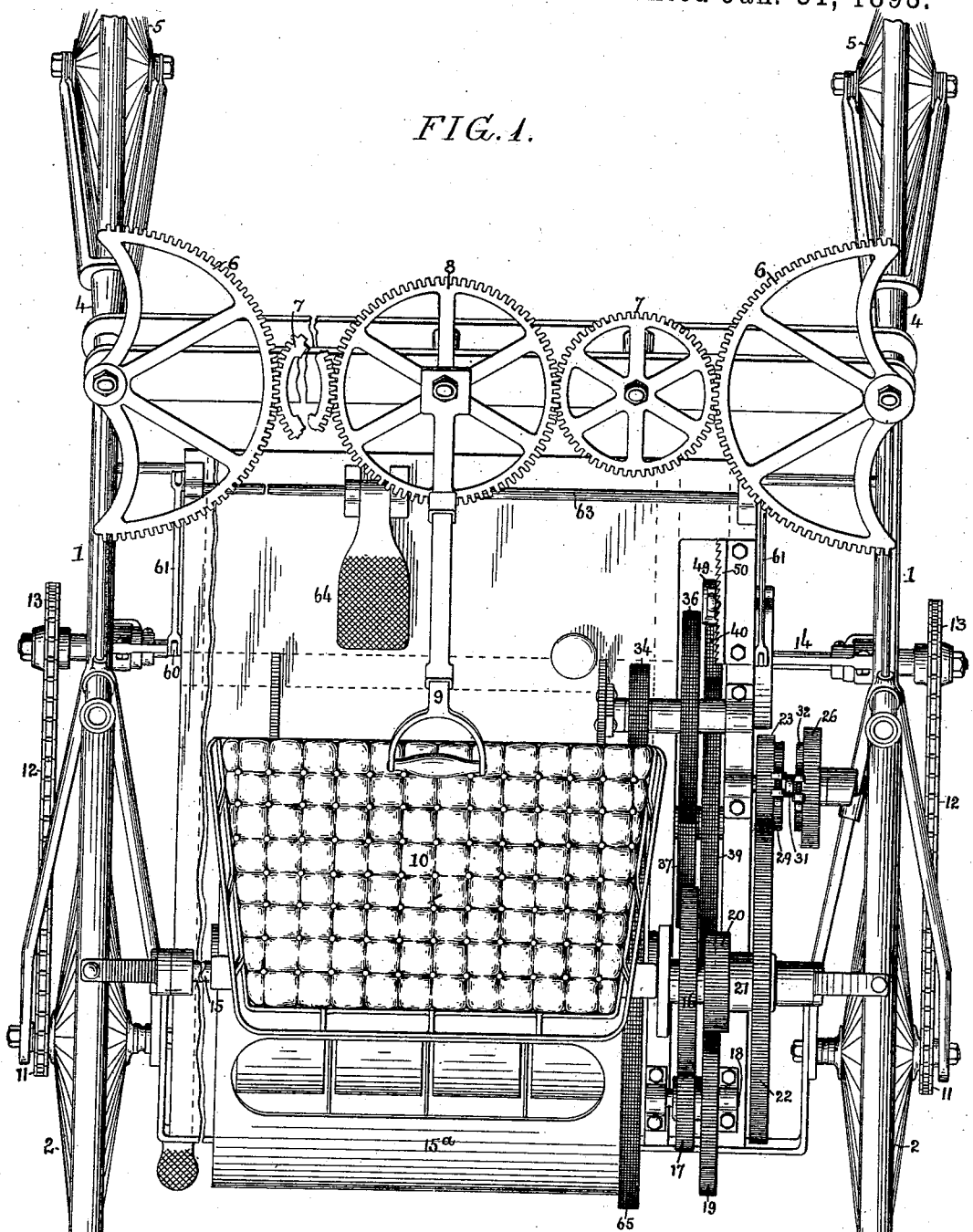
Figure 2:
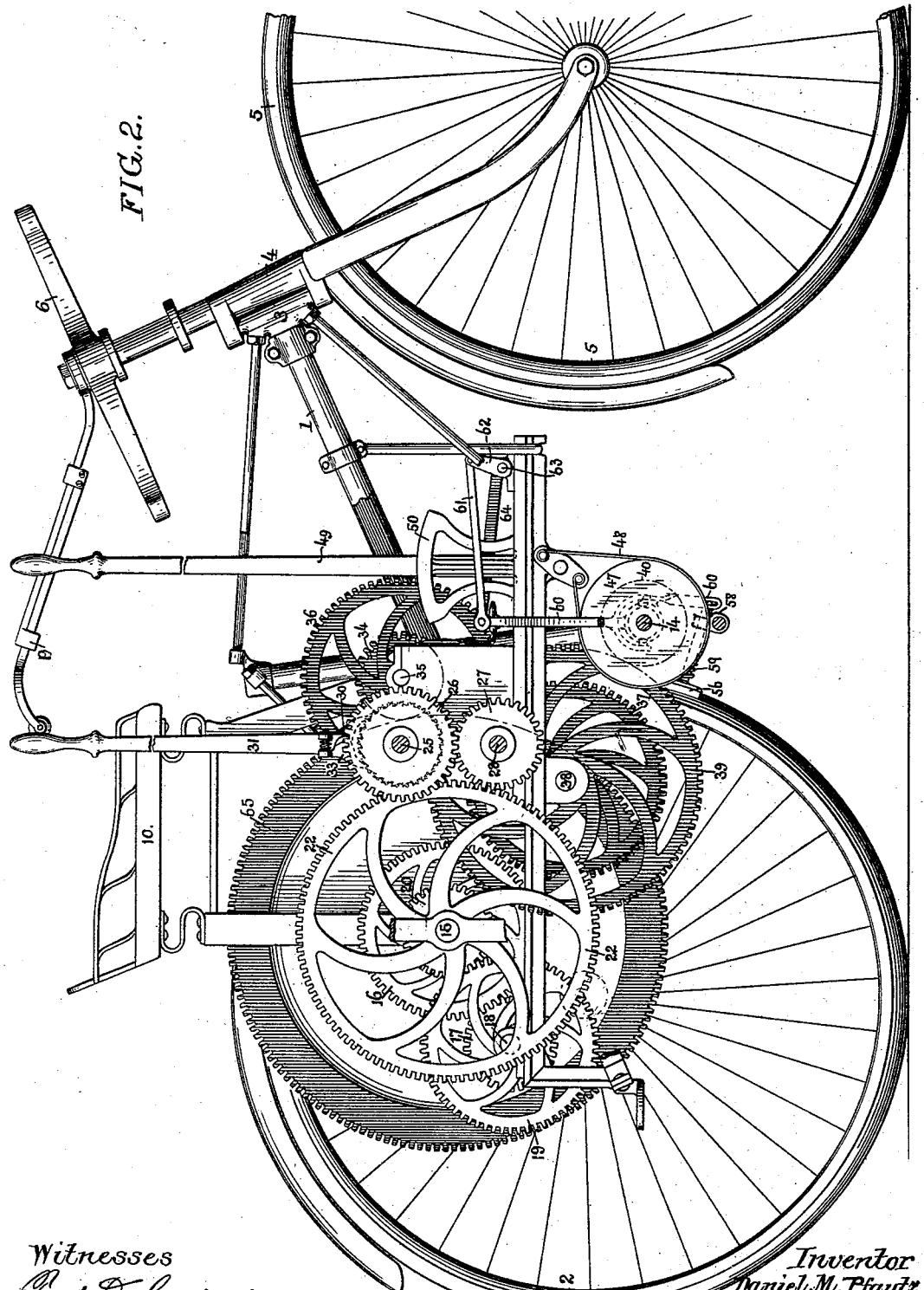

In the accompanying drawings: Figure 1, is a plan view of sufficient of a spring propelled vehicle to illustrate my invention, part of the vehicle being broken away in order to permit of the illustration of the essential parts of the same on a larger scale than could otherwise be employed; Fig. 2, is a view showing the front portion of the machine in side elevation, but the rear portion in section so as to illustrate the driving gearing more clearly; Fig. 3, is an enlarged transverse section showing in elevation part of the braking gear and the means for throwing the springs out of action when the vehicle is on a descending plane; Fig. 4, is a detached view of part of the winding gearing; and Fig. 5, is a diagram illustrating gearing whereby the momentum of the machine when on a descending grade may be utilized to wind up the springs.

In the drawings I have illustrated my invention as applied to a four wheeled vehicle, the two rear wheels being the driving wheels and the two front wheels steering wheels, but it will be evident that my invention may be carried out in other forms of vehicles, for instance, in one having a single central steering wheel at the front.

In the drawings, 1, 1, represent the opposite side frames of the vehicle which, in the present instance, are similar to the frames of an ordinary bicycle, although they may be constructed in any desired manner without departing from my invention. In the rear portion of each frame are bearings for the axle of the driving wheels 2, and at the front portion of each frame is a head 3 to which is hung a forked frame 4 carrying one of the front steering wheels 5, each forked frame having at the upper end a toothed segment 6 gearing into a spur pinion 7, the latter in turn engaging with a central spur wheel 8 which is provided with a steering handle 9 adjustable in length so as to be within easy reach of the occupant of the seat 10 of the vehicle.

The shaft or axle of the driving wheels 2 has sprocket wheels 11, and each of these sprocket wheels is geared by a chain 12 to a sprocket wheel 13 on a transverse driving shaft 14 adapted to suitable bearings on the frames 1 in front of the driving wheels, this shaft receiving the power from the spring shaft 15 to which the inner ends of the springs are secured, the outer ends of the springs being connected to a drum $15^a$ which is loose on the shaft and is caused to turn by the springs as the latter unwind, the winding of the springs being effected by the rotation of the shaft 15.

The winding and transmitting gearing is as follows, and is shown in Figs. 1 and 2, the transmitting gears being shaded in order to distinguish them from the winding gears. On the winding shaft 15 is fixed a spur wheel 16 which meshes with a pinion 17 on a shaft 18 adapted to suitable bearings at the rear of the frame, said shaft also having a spur wheel 19 which meshes with a pinion 20 carried by a sleeve 21 loose on the winding shaft and provided with a spur wheel 22 which meshes with two pinions 23 and 24, Fig. 4. The pinion 23 turns on a shaft 25 mounted in bearings on the frame of the machine, and on this shaft is also mounted a spur wheel 26 which meshes with a pinion 27 on the shaft 28 which carries the pinion 24. On the inner face of the pinion 23 is a right hand ratchet wheel 29 with which engages a spring pawl 30 mounted upon a winding lever 31 hung upon the shaft 25, and on the inner face of the spur wheel 26 is a left hand ratchet wheel 32 with which engages a spring pawl 33 also carried by the winding lever 31. It will therefore be seen that as the winding lever 31 is vibrated, continuous movement will be imparted to the spur wheel 22, and hence through the other wheels of the winding train to the spring shaft so as to wind up the springs, the forward movement of the winding lever being transmitted to the wheel 22 through the medium of the ratchet 29 and pinion 23, and the backward movement of said winding lever being transmitted to the wheel 22 through the medium of the ratchet 32, spur wheel 26 and pinions 27 and 24.

The transmitting gear whereby the rotating movement of the spring drum 15ª is imparted to the driving shaft 14 is as follows: On one end of said spring drum is mounted a spur wheel 65 which meshes with a spur pinion 34 on a short transverse shaft 35 at the front of the frame, said shaft also having a spur wheel 36 which meshes with a pinion 37 on a transverse shaft 38, the latter shaft having a spur wheel 39 which meshes with a spur pinion 40 on the driving shaft. The spur pinion 40 is loose on the shaft 14 but has a clutch sleeve 41 which is normally in engagement with a clutch sleeve 42 splined to said shaft 14 and movable back and forth thereon so as to unclutch the pinion 40 when desired, as for instance when the vehicle is on a descending grade and the spring power is not necessary in order to propel it.

The movement of the clutch 42 in order to carry it out of engagement with the clutch 41 is effected by pressure upon a foot plate 43, this movement being transmitted to the clutch 42 through the medium of a bell crank lever 44, link 45, and lever 46, the latter being forked to engage with the grooved portion of the clutch 42, as shown in Fig. 3.

When the pinion 40 is unclutched from the shaft 14 it is necessary to prevent rotation of the same, otherwise the springs would rapidly unwind, and I therefore secure to the hub of the spur wheel 40 a clutch drum 47 (Fig. 2) having a friction strap 48 which can be tightened by means of a brake lever 49, the latter being held in position, after tightening the brake, by means of a notched segment 50 with which a projecting tongue or lip on the brake lever engages.

If it is desired to utilize the momentum of the vehicle when on a descending grade to wind up the springs, gearing may be employed for connecting the spring drum to the shaft 14, under such circumstances, for instance, in Fig. 5 I have shown one form of gearing available for the purpose. In this case there is on the shaft 14 another pinion 51 which has a clutch sleeve 52 and the clutch sleeve 42 is duplex so that when in one position it will engage with the clutch sleeve 41 of the pinion 40, and when in the other position will engage with the clutch sleeve 52 of the pinion 51, as shown in Fig. 5. The pinion 51 meshes with a pinion 53 on a short transverse shaft 54 having another pinion 55 which meshes with the pinion 37 of the transmitting gear, hence when the parts are in the position shown in Fig. 5, forward movement of the shaft 14 will cause movement of the transmitting gear in a direction the reverse of the movement when the machine is being driven by the spring drum, hence said spring drum is likewise turned in the reverse direction, and the winding up of the springs is effected, it being understood, of course, that in this case the brake drum 47 is released from the grip of the brake band 48 so that the pinion 40 is free to rotate reversely on the shaft 14.

The braking of the vehicle is effected by the action of shoes 56 directly upon the tires of the driving wheels, each shoe having a spindle 57 which passes through a bearing 58, a spring 59 being interposed between said bearing and the shoe so as to tend normally to hold said shoe in contact with the tire of the driving wheel. The outer end of the spindle 57, however, is connected to the depending arm of the lever 60 which is loosely mounted on the shaft 14, the upper arm of said lever being connected by a link 61 to an arm 62 at one end of a rock shaft 63 which extends across the machine from side to side and has mounted upon it at a convenient point a treadle 64. When, therefore, pressure is exerted upon this treadle, the lever 60 will be so operated as to withdraw the brake shoes from contact with the tires of the driving wheels, the shoes being again forced into contact with said tires, however, by the springs 59 as soon as pressure is removed from the treadle. The driving wheels are, therefore, normally braked and effort on the part of the occupant of the vehicle is required in order to free the brakes from the wheels, hence the accidental running away of the machine is effectually prevented.

It will be evident that a single long pinion may, if desired, take the place of the pinions 23, 24, in Fig. 2, and various forms of rewinding gearing to be operated by the shaft 14 when the machine is running on a down grade may be employed without departing from the essential features of this part of my invention.

Having thus described my invention, I claim and desire to secure by Letters Patent:—

1. The combination of the spring shaft, the winding lever having two pawls, right and left ratchets, one engaged by one pawl, and the other by the other pawl, a spur wheel connected to one ratchet and meshing directly with a wheel of the winding train, and a spur wheel connected to the other ratchet and meshing indirectly with said wheel of the winding train through the medium of an interposed pinion or pinions, whereby the continuous winding of the springs may be effected by a back and forth vibration of the winding lever, substantially as specified.

2. The combination of the spring drum, the driving shaft, a pinion loose thereon, gearing connecting said pinion to the spring drum, a clutch for connecting said pinion to the driving shaft, a second pinion also loose on the driving shaft, a clutch for connecting said second pinion to the driving shaft, and gearing whereby the movement of said second pinion is caused to impart reverse movement to the transmitting gearing, and thence to the spring drum, in order to re-wind the springs through the medium of the driving shaft, substantially as specified.

3. The combination of the driving wheels of the vehicle, the brake shoes normally held in engagement with said wheels by springs, a treadle, and lever mechanism whereby said brake shoes can be withdrawn from contact with the wheels by the pressure of the foot, substantially as specified.

In testimony whereof I have signed my name to this specification in the presence of two subscribing witnesses.

DANIEL M. PFAUTZ.

Witnesses:
EUGENE ELTERICH,
HARRY SMITH.